AUGUSTUS JORDAN.
Improvement in Water Closets.
No. 120,979. Patented Nov. 14, 1871.
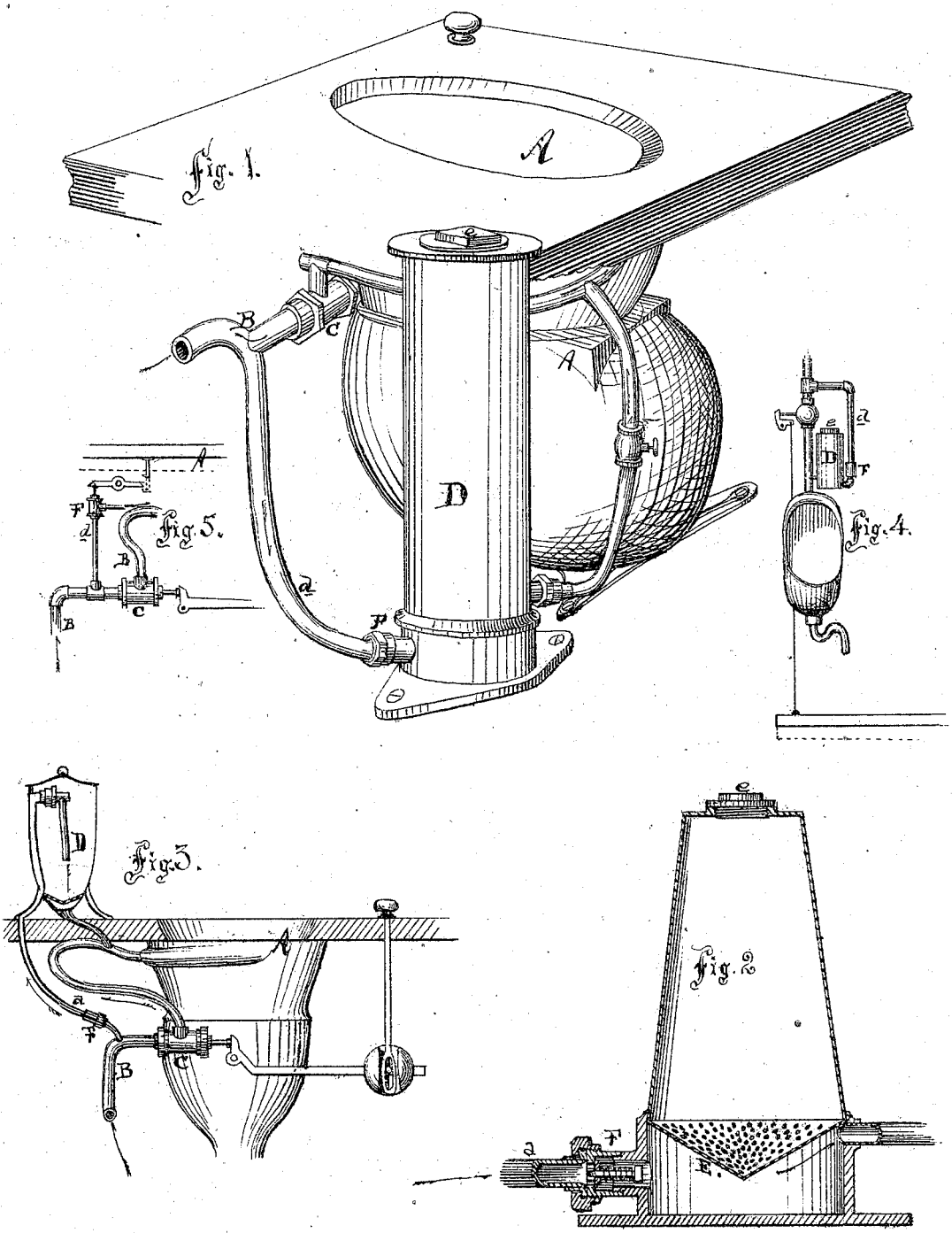

UNITED STATES PATENT OFFICE.

AUGUSTUS JORDAN, OF WASHINGTON, DISTRICT OF COLUMBIA.

IMPROVEMENT IN DEODORIZING APPARATUS FOR WATER-CLOSETS.

Specification forming part of Letters Patent No. 120,979, dated November 14, 1871.

*To all whom it may concern:*

Be it known that I, AUGUSTUS JORDAN, of Washington, in the county of Washington and District of Columbia, have invented a new and useful Improvement in Water-Closets and Urinals; and I do hereby declare the following to be a full, clear, and exact description of the same, reference being had to the accompanying drawing, in which—

Figure 1 is a perspective view of my invention attached to a water-closet. Fig. 2 is a vertical section of reservoir for deodorizing solution. Fig. 3 represents, in elevation, a modified arrangement of my invention. Fig. 4 represents, in elevation, my invention attached to a urinal. Fig. 5 represents the invention with a trip-valve operated by the motion of the seat.

My invention consists in a reservoir for some disinfecting or deodorizing substance or compound with suitable connecting mechanism and pipes, attached to and combined with the bowl of the water-closet or urinal, whereby whenever said bowl or urinal has been used and the water-flow arrested, a small quantity of water shall be automatically injected into said reservoir to dissolve and carry into said bowl or urinal a small quantity of said disinfectant to deodorize and disinfect any fecal or urinal deposit which may remain therein.

That others may fully understand my invention, I will particularly describe it and the principal methods in which I propose to apply it.

A is an ordinary seat and bowl of a water-closet. B is the main water-pipe, with a shut-off valve, C, which may be operated automatically or by hand, as desired. D is a reservoir for any suitable deodorizing or disinfecting substance or compound which is soluble in water. The reservoir D is connected with the supply-pipe B in front of the shut-off valve C, so that when the flow of water through the pipe B is suddenly arrested the force of water-ram will overcome the resistance of the weighted or spring-valve F in the pipe $d$, and cause a small quantity of water to flow into the reservoir D, displacing a similar quantity of water with disinfectant in solution, which thereupon flows into the bowl or trap to deodorize whatever fecal or urinal matter may have remained therein. In Figs. 1 and 2 the reservoir D is constructed with an air-tight screw-cap, $e$, at the top, through which said reservoir may be charged. The air confined within the reservoir acts as a cushion to prevent the water from rising therein far above the outlet. The deodorizing material rests upon a perforated diaphragm or gallery, E, near the reservoir, where it will subject the bottom of the mass of disinfectant to be slightly acted upon by the water, and, therefore, cause the water contained in the bottom of the reservoir to hold a small quantity of the disinfectant in solution at all times. As the deodorizing material slowly dissolves the mass sinks down, and the solution at the bottom will therefore be of uniform strength. The reservoir D may be constructed of any desired or convenient dimensions or form. It is desirable that the opening for the introduction of the deodorizer shall be conveniently accessible, and the top of the reservoir should, therefore, project through the seat, as shown in Fig. 1. If the water-closet is located in an out-building or other situation where it will be exposed to cold, so that it becomes necessary to place the water-cocks and valves below the reach of frost, the reservoir may be made long enough to extend below the reach of frost also. In Fig. 2 the reservoir is shown made slightly conical, so that there will be no possibility of clogging of the deodorizing material as it descends to the bottom. In Fig. 3 is represented a reservoir, D, placed entirely above the seat. The water is injected at the top and percolates through the deodorizing material and flows by its own gravity down into the bowl A. This arrangement is adapted to water-closets situated where no danger of frost is to be apprehended. When the reservoir is placed above the seat, as shown in Fig. 3, the valve F may be located anywhere between the main pipe and the reservoir, and it will be advisable then to construct said valve with a small waste-hole, so that water will not be permitted to stand in said pipe. The valve may be constructed so that said waste-hole will be closed by the opening of the valve, and vice versa. When the water-closet or urinal is constructed without moving traps the deodorizer will then flow down into the S-trap, which is necessarily employed, as shown in Fig. 4, and it will be understood that the flow of water from the main pipe must be intermittent with this apparatus.

From the above description of my invention it will be perceived that notwithstanding I prefer to utilize the water-ram to open the injection-valve F, and thus, also, destroy the unpleasant sound of said water-ram, it is obvious that said valve F may be operated automatically by other means; as for instance, it may be operated by a movement of the seat when the person rises therefrom; or, by a moving platform upon which the person necessarily rests the feet while using the closet or urinal; or it may be operated by the return of the pull G when the shut-off valve C closes. The first of said methods is shown in Fig. 4. These methods would be equally automatic with the first described, and would be equally effective; but I prefer the first described as being the least complicated and most compact and satisfactory.

Having described my invention, what I claim as new is—

1. In combination with the reservoir D and the bowl and water-pipe of a water-closet or urinal, an automatic injection-valve and pipe, arranged to cause a small quantity of water from said water-pipe to be injected into said reservoir after the flow through said supply-pipe is shut off, substantially as and for the purpose set forth.

2. The shut-off valve C and weighted or spring-valve F, arranged to be overcome by the water-ram upon closing of said valve C, combined with the reservoir D and the bowl of a closet or urinal, substantially as set forth.

AUGS. JORDAN.

Witnesses:
J. C. LYONS,
R. D. O. SMITH.                                (8)